United States Patent [19]

Daughenbaugh et al.

[11] Patent Number: 5,502,140
[45] Date of Patent: Mar. 26, 1996

[54] THERMALLY POLYMERIZED DICYCLOPENTADIENE/VINYL AROMATIC RESINS

[75] Inventors: Norman E. Daughenbaugh, Turtle Creek; Dane G. Goodfellow, Pittsburgh; Deborah A. Riedl, Library, all of Pa.

[73] Assignee: Hercules Incorporated, Wilmington, Del.

[21] Appl. No.: 325,763

[22] Filed: Oct. 19, 1994

[51] Int. Cl.⁶ .................................................. C08F 232/08
[52] U.S. Cl. .................. 526/283; 526/308; 526/335; 526/339; 526/340; 526/347; 526/347.1; 526/348.2
[58] Field of Search ..................... 526/283, 339, 526/340, 347.1

[56] References Cited

U.S. PATENT DOCUMENTS

| | | | |
|---|---|---|---|
| 2,560,492 | 7/1951 | Sparks et al. . | |
| 2,689,232 | 9/1954 | Gerhart . | |
| 3,040,009 | 6/1962 | Wadsworth et al. . | |
| 3,084,147 | 4/1963 | Wilks . | |
| 3,968,088 | 7/1976 | Asai et al. | 526/283 |
| 4,315,842 | 2/1982 | Tsuchiya et al. . | |
| 4,330,448 | 5/1982 | Iwata | 526/79 |
| 4,360,622 | 11/1982 | Tsuchiya et al. | 524/275 |
| 4,413,067 | 11/1983 | Tsuchiya et al. | 523/172 |
| 4,419,497 | 12/1983 | Tsuchiya et al. | 525/338 |
| 4,650,829 | 3/1987 | Bossaert et al. | 525/99 |
| 4,684,707 | 8/1987 | Evans | 526/290 |
| 4,927,885 | 5/1990 | Hayashida et al. | 525/211 |
| 4,952,639 | 8/1990 | Minomiya et al. | 525/327.9 |
| 5,109,081 | 4/1992 | Pannell et al. | 526/68 |
| 5,171,793 | 12/1992 | Johnson et al. | 525/332.1 |
| 5,177,163 | 1/1993 | Chu et al. | 526/76 |

FOREIGN PATENT DOCUMENTS

| | | |
|---|---|---|
| 15802 | 1/1988 | Japan . |
| 194629 | 8/1993 | Japan . |

*Primary Examiner*—Fred Zitomer
*Attorney, Agent, or Firm*—R. P. O'Flynn O'Brien; Joanne W. Patterson

[57] ABSTRACT

A hydrocarbon resin is prepared by (1) thermally polymerizing a mixture consisting essentially of (a) about 40% to 90% by weight based on total monomers of a cyclic diolefin component comprising at least about 50% by weight dicyclopentadiene, and (b) about 60% to 10% by weight based on total monomers of a specified vinyl aromatic component, preferably alpha-methylstyrene; para-methyl-α-methylstyrene; 2,4-diphenyl-4-methyl-1-pentene, or mixtures thereof, and (2) recovering a product having a Ring and Ball softening point of about 70° to about 150° C. Hydrogenation of this resin produces light colored, thermally stable products that are useful as tackifiers in adhesives.

16 Claims, No Drawings

THERMALLY POLYMERIZED DICYCLOPENTADIENE/VINYL AROMATIC RESINS

FIELD OF THE INVENTION

This invention relates to thermally polymerized copolymers of dicyclopentadiene and vinyl aromatic compounds, a method for making the copolymers, and the hydrogenated products thereof.

BACKGROUND OF THE INVENTION

Methods are known for thermally polymerizing and copolymerizing dicyclopentadiene (DCPD) feedstocks and for hydrogenating the copolymer product. For example, U.S. Pat. No. 4,650,829 discloses a hydrogenated hydrocarbon resin having a softening point lower than 90° C. and containing at least 40 weight % of monomer units derived from cyclopentadiene alone and cyclopentadiene plus a comonomer of the class consisting of alkyl-substituted cyclopentadiene, acyclic dienes, vinyl aromatics and mixtures thereof. U.S. Pat. No. 5,171,793 discloses the thermal polymerization of a vinyl aromatic component comprising a mixture of styrene and indene and alkylated derivatives thereof, and a cyclodiene at a temperature of 270° C. for two hours. The dark colored resin product is mixed with a solvent diluent and hydrogenated to produce a resin having softening points higher than 100° C. U.S. Pat. No. 3,040,009 discloses the production of light colored resins by redistilling the bottom fraction of dripolene, a normally liquid mixture of hydrocarbons obtained by high temperature pyrolysis of hydrocarbon gases. The thermally polymerized resin is hydrogenated using a catalyst consisting of metallic nickel distributed on a porous support.

In the past, the molecular weight of cyclopentadiene-based resins was controlled by including codimers of cyclopentadiene with a diene such as methylcyclopentadiene, butadiene, isoprene or piperylene, and also by adding these same linear dienes directly into the polymerization process. In these processes, insoluble waxy polymers were often obtained below a reaction temperature of 250° C. Other methods of softening point and molecular weight control involved not only temperature, but also initial monomer concentration and time in the reactor. Advantages have also been claimed in the final adhesives when indene streams and/or C-9 streams are copolymerized with DCPD streams. However, these C-9 and indene streams are known to contain sulfur, which can create problems in the subsequent hydrogenation process due to early poisoning of the catalyst.

It is known that in a given family of hydrocarbon resins, i.e., all of those based on the same feedstock, as the softening point goes up, molecular weights and polydispersity also tend to increase. It is also known that there is a trend toward higher softening points and molecular weights as reaction times and temperatures are increased during the thermal homopolymerization of dicyclopentadiene. In addition, when vinyl monomers other than alpha-methylstyrenes are used to modify DCPD feedstocks, e.g., styrene and other ring-substituted styrenes such as t-butylstyrene and vinyltoluenes, high molecular weights and polydispersities result.

It would be desirable to provide thermally polymerized resins based on low cost DCPD feedstocks, with relatively low molecular weights and relatively high softening points that do not change substantially with time in the reactor. These resins should preferably readily convert to the corresponding hydrogenated water-white and thermally stable derivatives.

SUMMARY OF THE INVENTION

The hydrocarbon resins of this invention consist essentially of a thermally polymerized copolymer made from (1) about 40% to 90% by weight based on total monomers of a cyclic diolefin component comprising at least about 50% by weight dicyclopentadiene, and (2) about 60% to 10% by weight based on total monomers of at least one vinyl aromatic component having the formula

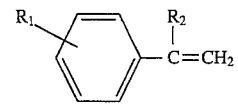

where $R_1$ is H or a 1–10 carbon linear or branched chain alkyl group at the meta- or para-position and $R_2$ is a 1–10 carbon linear or branched chain alkyl group or a 2-methyl-2-phenylpropyl group, the resin having a Ring and Ball softening point of about 70° C. to about 150° C. Alpha-methylstyrene; para-methyl-alpha-methylstyrene; 2,4-diphenyl-4-methyl-1-pentene, or mixtures thereof are the preferred aromatic compounds. The resins are essentially free of halogen, since thermal polymerization avoids the need for Friedel-Crafts catalysts, which produce resins containing organically bound halogen.

Also according to the invention, the thermally polymerized resin can be hydrogenated to produce resins useful as tackfiers for adhesives. The preferred hydrogenated resins are water-white in color and thermally stable. In a preferred embodiment, resins that can be hydrogenated efficiently with minimal poisoning of the hydrogenation catalyst are produced from relatively sulfur-free DCPD feedstocks.

Use of the specified aromatic comonomers makes it possible to control the molecular weight and the softening point during the thermal polymerization. It is thus possible to obtain a resin with a suitably high softening point without rapid increase in molecular weight during the polymerization process.

DETAILED DESCRIPTION OF THE INVENTION

Monomers suitable for use as the cyclic diolefin component (1) in the manufacture of the hydrocarbon resins of this invention include essentially pure DCPD (at least 95% by weight pure monomer), or mixtures of dicyclopentadiene with codimers of cyclopentadiene and at least one of methylcyclopentadiene, isoprene, butadiene, and piperylene, for example, a mixture containing 50% to 95% or more dicyclopentadiene. Particularly useful DCPD feedstocks are DCPD 101 and/or DCPD 108 available from Lyondell Petrochemical Co., Houston, Tex., U.S.A., which have <1 ppm sulfur. Low sulfur DCPD feedstocks allow more efficient hydrogenation, since there is little sulfur present to poison the catalyst. However, the use of low sulfur feedstocks is not essential for the practice of this invention. Resins made from sulfur-containing DCPD feedstocks can still be hydrogenated, since there are processes that overcome the effect of catalyst poisoning from the sulfur.

The vinyl aromatic monomer comprises at least one compound having the formula

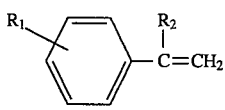

where $R_1$ is H, or a 1–10 carbon linear or branched chain alkyl group at the meta- or para-position, e.g., a methyl, ethyl, isopropyl or t-butyl group, and $R_2$ is a 1–10 carbon linear or branched chain alkyl group or a 2-methyl-2-phenylpropyl group. Alpha-methylstyrene (AMS); para-methyl-alpha-methylstyrene; 2,4-diphenyl-4-methyl-1-pentene (an unsaturated dimer of AMS), or mixtures thereof are preferred. AMS is most preferred. Up to about 15% by weight of total monomers can be a vinyl aromatic monomer other than those specified above, e.g., styrene and styrenes that are ring-substituted with straight chain or branched aliphatic groups, e.g., vinyltoluenes and t-butylstyrene.

The resin product consists essentially of about 40% to 90% by weight based on total monomers of the cyclic diolefin component and about 60% to 10% by weight based on total monomers of the vinyl aromatic component, the total equaling 100%. For the most efficient reaction, the ratio of cyclic diolefin component (1) to vinyl aromatic component (2) is preferably 1:1 or greater. If the amount of vinyl aromatic component exceeds 50%, the yield will decrease, since there will not be enough DCPD to react with all of the vinyl aromatic component. AMS and the other vinyl monomers defined by the formula given above do not homopolymerize. The softening point of the resin product is about 70° to 50° C., preferably about 80° to 140° C.

Reactions can be carried out in solution or neat. When a solvent is used, it is preferably either aliphatic or aromatic. The copolymerization can be carried out in a continuous process, or in a batch mode.

The polymerization is carried out at a temperature of about 210° to 300° C., more preferably about 215° to 280° C., and most preferably about 225° to 275° C. The reaction pressure is self-generated and is typically between 0 and about 150 psig. The reaction time is typically about 10 minutes to about 16 hours at reaction temperature.

The resins of this invention with Ring and Ball (R&B) softening points of 140°±5° C. have a maximum Mz of about 4,000, a maximum Mw of about 2,500, and a maximum Pd of about 3.0. Resins with a R&B softening point of 125°±5° C. have a maximum Mz of about 3,000, a maximum Mw of about 2,000, and a maximum Pd of about 2.5. Resins with a R&B softening point of 100°±5° C. have a maximum Mz of about 2,000, a maximum Mw of about 1,000, and a maximum Pd of about 2.0.

Mz (z average molecular weight) gives an indication of the high molecular weight tail in the resin and has a pronounced effect on the compatibility of the resin in an adhesive base polymer. High Mz is generally undesirable. Mw (weight average molecular weight) is an indication of the average molecular weight of the resin. Mn (number average molecular weight) provides information on the lower molecular weight portions of the resin. Pd (polydispersity) describes the broadness of the molecular weight distribution and is the ratio of Mw/Mn. Mz, Mn, and Mw were determined by size exclusion chromatography using a refractive index detector.

The use of the specified vinyl aromatic monomers provides a reasonably long period of time, i.e., several hours, at selected temperatures during which the hydrocarbon resin can be manufactured while keeping the molecular weight and softening point from substantially increasing with time. It is therefore not necessary to keep the process operating parameters under strict control. For example, when DCPD/AMS at a ratio of 80/20 is thermally reacted in an aliphatic solvent at 60% initial monomer concentration at 240° C., there is a reaction time between 4 and 6 hours, and at 245° C. there is a reaction time between 2 and 5 hours during which the softening point remains between 99° and 106° C., Mz and Mw average 1304 and 555 respectively, and Pd is approximately 2.0 or below.

Unlike cationically polymerized products made from similar monomers, thermally polymerized DCPD-based resins retain double bonds that can react further in various ways. The low molecular weight oligomers that are removed from the resin product by distillation before hydrogenation are also reactive. These oligomers can be recycled back into the reaction process with fresh monomer to effectively increase the conversion of monomer to the resin product. Recycle of the oligomers effectively raises the yield from the typical 50% to 60% to around 90% in the eighth recycle, while still keeping the softening point and molecular weight approximately constant.

Although the unhydrogenated resins tend to be dark in color, they can be used as tackifiers in adhesive systems where initial color is not critical. They can also be used in caulking compounds, sealants, printing inks, waterproofing compositions, and wax compounds. Because the resins retain some reactive unsaturation, these resins can be reacted cationically with other monomers to provide "grafted" terpolymers or "block" copolymer resins.

In order to obtain the highest quality adhesive tackifiers from the copolymers of this invention, it is desirable to hydrogenate the copolymer to lighten the color and remove some or essentially all of the unsaturation, both aliphatic and aromatic, which in turn improves their thermal stability. Halogen and sulfur are essentially not present in the most preferred hydrocarbon resins of this invention. The feedstocks can be chosen to be essentially free of sulfur, and thermal polymerization avoids the need for Friedel Crafts catalysts such as aluminum chloride that cause chlorine to be organically bound to the resin product. The resins can then be economically hydrogenated with well known hydrogenation catalysts.

Catalysts for the hydrogenation of the copolymer resins of this invention comprise metals selected from Groups VIII, IB, IIB, VIB, and VIIB of the Periodic Table, which are typically used on a support such as aluminosilicate, alumina, carbon, charcoal, or kieselguhr. Group VIII catalysts are preferred, and nickel catalysts are most preferred. Particularly useful catalysts when hydrogenation is carried out in batch autoclaves on sulfur-free resins using slurried catalyst are Ni 5136P and Ni 5256P, available from Engelhard Corporation, Chemical Catalyst Group, Iselin, N.J., U.S.A., and G-96, available from United Catalysts, Louisville, Ky., U.S.A. The hydrogenation process can also be continuous, utilizing either continuous stirred reactors or fixed bed catalyst reactors.

The hydrogenation can be carried out neat or in solution. When a solvent is used, aliphatic and/or naphthenic solvents are preferred. The temperature of hydrogenation is about 100° C. to 300° C., preferably about 150° to 290° C., and most preferably about 160° to 280° C. The reaction time is typically about 5 minutes to 10 hours, preferably about 10 minutes to 8 hours, and most preferably about 15 minutes to 6 hours.

The light color hydrogenated resins have good thermal stability that can be improved still further by the addition of small amounts of antioxidants such as, for example, IRGANOX 1010®, a hindered phenol available from Ciba-Geigy, Hawthorne, N.Y., U.S.A. IRGANOX® 1010 is tetrakis [methylene(3,5-di-tert-butyl-4-hydroxyhydrocinnamate)] methane.

The hydrogenated resins are useful as tackifiers for adhesives, caulking compounds, and sealants; in paints, labels, and tapes; as modifiers, extenders and processing aids for plastics, printing inks, overprint varnishes and other clear coatings; in textile dry sizes, ceramic tile grout, varnishes, waterproofing compositions and wax compounds.

In the following examples, OMSCP means odorless mineral spirits cloud point, which is determined by the following procedure. Ten weight percent resin is mixed in a test tube with odorless mineral spirits. The test tube is then heated until a clear solution is formed. The solution is cooled until turbidity is obtained. The onset of initial turbidity is recorded as the initial cloud point. Cooling of the test tube is continued until visibility is totally obstructed. The final cloud point is recorded at the point of no visibility.

MMAP is the mixed methylcyclohexane aniline cloud point, which is determined using a modified ASTM D-611-82 [1987] procedure. Methylcyclohexane is substituted for the heptane used in the standard test procedure. The procedure uses resin/aniline/methylcyclohexane in a ratio of 1/2/1 (5 g/10 ml/5 ml) and the cloud point is determined by cooling a heated, clear blend of the three components until complete turbidity just occurs. Hydrogenation of the unsaturated portion of a resin, particularly aromatic unsaturation would result in an increase in the MMAP.

R&B softening point is the Ring and Ball softening point, determined according to ASTM E28-67.

To determine the Gardner color (G), 50 weight percent resin is mixed with reagent grade toluene at room temperature until it dissolves. The color of the resin solution is compared to a set of standards on a Gardner Delta Model 211-A Color Comparator, available from BKY Gardner, Inc., Silver Springs, Md., U.S.A. The color values range from 1 to 18, with 18 being the darkest. The notation Gardner 1- (less than Gardner 1) is used to designate a water-white solution.

The Yellowness Index (YID) is obtained by direct readout from a Pacific Scientific Spectrogard™ Color System, Model 96, available from BKY Gardner, Inc., using a measurement cell with a path length of 5.0 cm. The Yellowness Index is useful to distinguish colors lighter than Gardner 1. The closer the YID is to 0, the lighter the color. There is no direct correlation between Gardner colors and the YID, but experience has shown that Gardner 1 is approximately equal to a YID of 40 when both are measured as a 50% solution of resin in toluene and the YID is measured with a measurement cell with a path length of 5.0 cm.

UVα is a measure of the level of hydrogenation. It is determined in a cyclohexane solution by scanning the spectrum from about 300 nm down to a point where the cyclohexane just begins to absorb. UVα is determined at the point in the scan between 300 nm and the cyclohexane initial absorbance where maximum absorbance occurs. Fully hydrogenated resins exhibit very low UVα values, e.g., about 0.05 to 0.10.

The laboratory thermal polymerization experiments were carried out in conventional stirred one-liter autoclaves available from Parr Instrument Company, Moline, Ill., U.S.A., equipped with an electronically controlled internal cooling loop and heated externally by an electric heating mantle.

The monomer blend, and solvent when used, was charged to the autoclave and the apparatus was purged with nitrogen before sealing. While stirring, the apparatus was brought to the desired reaction temperature. The heat-up rate was not critical with times of less than one hour up to twelve hours having been demonstrated. For convenience in the laboratory, quick heat-up was preferred. After the desired time at reaction temperature, the reactor and contents were cooled. The resin was isolated using conventional techniques which included removing solvent and unreacted materials under a nitrogen stream up to 210° C. and then low molecular weight oligomers under steam at 225° C. Steam stripping was gentle to help prevent molecular weight increase in the thermally reactive polymer (only 2 ml oil accumulated per each 50 ml of condensed steam water).

The laboratory hydrogenation experiments utilized Parr 1-liter autoclaves. The general procedure was to charge resin, solvent if needed, and catalyst to the autoclave. After flushing to ensure a nitrogen atmosphere, 200 psig hydrogen was used for start-up. At 160° C., the hydrogen pressure was adjusted to 900 psig and the final reaction temperature was achieved and maintained by selective heating/cooling as needed. When the desired reaction time was complete, the mixture was cooled, vented and flushed with nitrogen. Catalyst was removed by filtration and the hydrogenated products were isolated by distilling off solvent and oligomers. The final distillation was conducted under steam. Other specific conditions are given in the examples.

Comparative Example 1

This example describes the homopolymerization of dicyclopentadiene. No vinyl aromatic monomers are present.

A mixture of 360.0 g of DCPD 101 and 240.0 g of recycled aliphatic solvent was heated to the desired reaction temperature in about one hour, using the reaction procedure described above. DCPD 101, available from Lyondell Petrochemical Co., Houston, Tex., U.S.A., contains 85% DCPD and <1 ppm sulfur. The reaction time and temperature are given in Table 1, along with the properties of the resin product. The undesirable waxes that formed at reaction temperatures of 240° and 245° C. and short reaction times are insoluble in most common solvents.

TABLE 1

| Reaction Temp. | Property | 1.0 Hr. | 2.0 Hr. | 3.0 Hr. | 4.0 Hr. | 6.0 Hr. |
|---|---|---|---|---|---|---|
| 240° C. | Yield (%) | 37.4 | 39.6 | 59.6 | 58.0 | 77.9 |
| | S.Pt. (°C.) | (150)* | (>180)* | 112 | 115 | 151 |
| | Mz | 483 | — | 1106 | 1234 | 2944 |
| | Wax? | Yes | Yes | No | No | No |
| 245° C. | Yield | 35.4 | 44.4 | 51.4 | 57.2 | 74.8 |
| | S.Pt. (°C.) | (160)* | (140)* | 116 | 110 | 156 |
| | Mz | | 424 | 817 | 969 | 2653 |
| | Wax? | Yes | Yes | No | No | No |
| 250° C. | Yield | | | 75.7 | 63.7 | |
| | S.Pt. (°C.) | | | 140 | 155 | |
| | Mz | | | 2793 | 2375 | |
| | Wax? | | | No | No | |

*Approximate wax melting points using standard R&B softening point method.

Comparative Example 2

This example describes the copolymerization of dicyclopentadiene with vinyl aromatic monomers other than those claimed in the present invention. The vinyl aromatic component, monomer concentration, reaction temperature and reaction time all varied as shown in Table 2. The monomer concentration is given in parts, with the remainder being solvent (total=100).

EXAMPLE 4

This example describes the operating conditions required to prepare a dicyclopentadiene/alpha-methylstyrene (AMS) copolymer at a specified reaction temperature where the molecular weight and softening point are substantially unchanged.

TABLE 2

| Sample | Vinyl Aromatic Monomer (VA) | DCPD/VA | Monomer Concentration (parts) | Reaction Temp. (°C.) | Reaction Time (Min.) | Yield (%) | S.Pt. (°C.) | Mz | Mw | Pd | Gardner Color |
|---|---|---|---|---|---|---|---|---|---|---|---|
| 1 | Styrene | 85/15 | 60 | 275 | 15 | 55.2 | 95 | 1560 | 617 | 2.03 | 7+ |
| 2 | Styrene | 85/15 | 60 | 275 | 45 | 66.1 | 100 | 1828 | 656 | 2.19 | 7– |
| 3 | Styrene | 75/25 | 60 | 275 | 30 | 54.9 | 97 | 4349 | 939 | 2.81 | 8– |
| 4 | Styrene | 60/40 | 60 | 275 | 30 | 42.5 | 81 | 11883 | 1798 | 4.99 | 5 |
| 5 | Styrene | 50/50 | 50 | 250 | 480 | 77.8 | 105 | 18591 | 3021 | 5.32 | 10+ |
| 6 | Styrene | 40/60 | 60 | 275 | 45 | 72.9 | 92 | 19651 | 3266 | 5.39 | 8+ |
| 7 | Vinyltoluene | 50/50 | 60 | 250 | 240 | 78.3 | 94 | 15277 | 2920 | 5.11 | 7+ |
| 8 | t-Butylstyrene | 50/50 | 60 | 250 | 240 | 75.1 | 108 | 9636 | 2063 | 3.82 | 6+ |

EXAMPLE 3

This example describes the copolymerization of dicyclopentadiene and alpha-methylstyrene (AMS) at various monomer ratios up to 50/50. The effects of monomer ratio, initial monomer concentration, reaction temperature, and reaction time are shown in Table 3.

The effect of using AMS as the vinylaromatic (VA) comonomer rather than styrene can be seen by comparing Sample 7 of Table 3 (AMS) with Sample 5 of Table 2 (styrene). At a DCPD/VA ratio of 50/50 under otherwise identical conditions except for the VA monomer, even after 8.0 hours of reaction, AMS has limited the Mz to 2292 and Pd to 2.2, while styrene produced an Mz of 18,591 and a Pd of 5.32.

Sample 12 of Table 3 demonstrates that including up to about 15% of other vinylaromatic monomers, based on total weight of monomers, can be accommodated as long as the rest of the vinylaromatic component is AMS. It is therefore possible to make terpolymers with controlled molecular weights.

Dicyclopentadiene 101 (288.0 g), 72.0 g of AMS, and 240.0 g of recycle solvent for each reaction were contained in an autoclave and brought to 170° C. quickly. DCPD 101 contains 85% DCPD and <1 ppm sulfur and is available from Lyondell Petrochemical Company, Houston, Tex., U.S.A. In the next hour the reaction temperature was brought to the desired value as specified in Table 4. After the specified reaction time at temperature, the reaction products were cooled to 170° C. in 35 minutes, poured into stripping flasks and finished, solvent distilled under nitrogen up to 210° C., and finally treated with steam at 225° C.

TABLE 3

| Sample | Vinyl Aromatic Monomer (VA) | DCPD/VA | Monomer Concentration | Reaction Temp. (°C.) | Reaction Time (Min.) | Yield (%) | S.Pt. (°C.) | Mz | Mw | PD | Gardner Color |
|---|---|---|---|---|---|---|---|---|---|---|---|
| 1 | AMS | 85/15 | 60 | 275 | 45 | 37.5 | 105 | 1404 | 599 | 1.96 | 10– |
| 2 | AMS | 85/15 | 60 | 240 | 300 | 60.4 | 107 | 1362 | 516 | 1.99 | 8+ |
| 3 | AMS | 80/20 | 60 | 250 | 300 | 66.7 | 118 | 1919 | 814 | 2.20 | 10+ |
| 4 | AMS | 50/50 | 60 | 225 | 240 | 38.9 | 81 | 1015 | 524 | 1.71 | 11 |
| 5 | AMS | 50/50 | 60 | 237 | 240 | 40.5 | 80 | 1084 | 561 | 1.74 | 12– |
| 6 | AMS | 50/50 | 60 | 246 | 240 | 49.7 | 93 | 1511 | 735 | 1.92 | 14+ |
| 7 | AMS | 50/50 | 50 | 250 | 480 | 64.2 | 101 | 2292 | 1084 | 2.20 | 18 |
| 8 | AMS | 50/50 | 60 | 275 | 180 | 63.0 | 110 | 3402 | 1420 | 2.71 | 16+ |
| 9 | AMS | 50/50 | 80 | 237 | 240 | 50.9 | 84 | 1327 | 645 | 1.88 | 12+ |
| 10 | AMS | 50/50 | 100 | 230 | 240 | 54.4 | 92 | 1462 | 693 | 1.9 | 12– |
| 11 | AMS | 50/50 | 100 | 250 | 240 | 73.5 | 110 | 3541 | 1497 | 2.78 | >18 |
| 12 | AMS/Styrene | 70/15/15 | 60 | 275 | 15 | 62.5 | 84 | 2193 | 665 | 2.17 | 8 |

TABLE 4

| Reaction Temp. | Property | 1.0 Hr. | 2.0 Hr. | 3.0 Hr. | 4.0 Hr. | 5.0 Hr. | 6.0 Hr. | 7.0 Hr. | 8.0 Hr. |
|---|---|---|---|---|---|---|---|---|---|
| 235° C. | Yield (%) | | | | | | | | 66.8 |
| | S.Pt. (°C.) | | | | | | | | 105 |
| | OMSCP (°C.) | | | | | | | | 55/−38 |
| | MMAP (°C.) | | | | | | | | 43/37 |
| | Color | | | | | | | | 10− |
| | Mz | | | | | | | | 1700 |
| | Mw | | | | | | | | 715 |
| | Pd | | | | | | | | 2.08 |
| 240° C. | Yield (%) | | | 45.3 | 50.3 | 60.7 | 61.8 | | 62.3 |
| | S.Pt. (°C.) | | | (135)* | 99 | 101 | 106 | | 111 |
| | OMSCP (°C) | | | 125/−25 | 135/−30 | 52/<−50 | 87/<−50 | | 56/−50 |
| | MMAP (°C.) | | | 115/30 | 102/33 | 47/34 | 40/37 | | 39/37 |
| | Color | | | 7+ | 7+ | 9+ | 10− | | 10 |
| | Mz | | | 834 | 1063 | 1290 | 1423 | | 1689 |
| | Mw | | | 393 | 490 | 574 | 641 | | 682 |
| | Pd | | | 1.64 | 1.76 | 1.92 | 1.95 | | 2.12 |
| 245° C. | Yield (%) | 33.1 | 44.5 | 49.7 | 58.4 | 59.3 | 62.3 | 69 | 66.3 |
| | S.Pt. (°C.) | (141)* | 101 | 101 | 104 | 105 | 112 | 129 | 127 |
| | OMSCP (°C) | 135/−30 | 136/−40 | 59/<−50 | 40/−42 | 61/<−50 | 44/−45 | 68/45 | 45/26 |
| | MMAP (°C.) | 115/35 | 116/30 | 65/36 | 40/37 | 38/36 | 40/37 | 46/38 | 43/40 |
| | Color | 7+ | 7+ | 8+ | 9+ | 9+ | 10 | 12 | 11 |
| | Mz | 963 | 970 | 1243 | 1553 | 1589 | 1695 | 2432 | 2188 |
| | Mw | 423 | 429 | 498 | 624 | 632 | 732 | 1030 | 928 |
| | Pd | 1.67 | 1.70 | 1.90 | 2.00 | 2.02 | 2.10 | 2.43 | 2.32 |
| 250° C. | Yield (%) | | | 54.4 | 62.1 | 66.7 | 67.5 | | |
| | S.Pt. (°C.) | | | 99 | 117 | 118 | 124 | | |
| | OMSCP (°C) | | | 32/<−50 | 15/−32 | 18/−3 | 30/2 | | |
| | MMAP (°C.) | | | 38/35 | 47/36 | 46/40 | 41/40 | | |
| | Color | | | 9− | 10− | 10+ | 11− | | |
| | Mz | | | 1189 | 1666 | 1919 | 2086 | | |
| | Mw | | | 536 | 710 | 814 | 871 | | |
| | Pd | | | 1.83 | 2.08 | 2.28 | 2.27 | | |

*Approximate wax melting points using standard R&B softening point method.

EXAMPLE 5

This example describes the copolymerization of dicyclopentadiene and alpha-methylstyrene in which low molecular weight oligomers are recycled to increase the conversion of monomers to resin.

A mixture of 306.0 g of DCPD 101, 54.0 g of AMS, and 240.0 g of recycled aliphatic solvent was brought quickly to 170° C. in a stirred autoclave. DCPD 101 is available from Lyondell Petrochemical Company, Houston, Tex., U.S.A., and contains 85% DCPD and <1 ppm sulfur. From this point the reactor temperature was raised to 275° C. in 20 minutes. After 45.0 minutes at 175° C., the reactor was quickly cooled to 170° C. in about five minutes. After transferring the polymerized resin solution to a glass stripping apparatus, the resin was isolated by heating, first under nitrogen and then under steam to give the "0" cycle resin. All the volatiles that were removed from the resin were combined to create a "recycle pool". Recycle #1 was prepared by mixing 240.0 g of volatiles from the original recycle pool with 306.0 g of fresh DCPD 101 and 54 g of AMS and repeating the initial reaction process steps exactly except that the time at 275° C. was shortened to 15 minutes. The resin was isolated and the volatile materials were again added to the recycle pool. Seven more recycle experiments were conducted in the same manner with data from selected cycles listed below:

TABLE 5

| Re-cycle No. | Volatiles Yield (% Total Charge) | Yield (% of Monomer Charge) | Resin Properties | | | | |
|---|---|---|---|---|---|---|---|
| | | | S.Pt. (°C.) | Gardner Color | Mz | Mw | Pd |
| 0 | 55.6 | 37.5 | 105 | 10− | 1404 | 599 | 1.96 |
| 1 | 57.6 | 57.8 | 96 | 9+ | 1335 | 550 | 1.92 |
| 2 | 43.4 | 67.7 | 102 | 9+ | 1403 | 590 | 1.96 |
| 4 | 44.6 | 81.2 | 98 | 11− | 1636 | 654 | 2.11 |
| 8 | 39.0 | 89.9 | 103 | 12+ | 2108 | 892 | 2.34 |

Overall conversion of monomers to resin will be at least 80 to 90% when utilizing recycle volatiles at the 40% level as part of the reactor charge and Mz will be close to 2000. Adjustments in molecular weight and yield can be effected by changes in percent of recycle volatiles utilized, polymerization temperatures, and reaction time.

EXAMPLE 6

This example illustrates the use of DCPD 108 (95% purity DCPD) as the cyclopentadiene source and also shows neat polymerization followed by solution hydrogenation without isolating the desired base resin from the polymerization reaction mixture. DCPD 108 is available from Lyondell Petrochemical Company, Houston, Tex., U.S.A., and contains 95% DCPD and <1 ppm sulfur.

Mixtures containing 250 g of DCPD 108 and 250 g of AMS were placed in each of the two one-liter autoclaves. Each mixture was reacted at 250° C. for four hours after 3.4 hour heat-up times. After cooling below 150°, the autoclave contents were combined and mixed with 333 g of aliphatic solvent. Ni 5136P (3.13 g) available from Engelhard Corporation, Chemical Catalyst Group, Iselin, N.J., U.S.A. was added to 500 g of this combined resin solution in a 1-liter autoclave at room temperature. During subsequent heat-up, full hydrogen pressure was applied at 160° C. to prevent any increase in molecular weight in the base resin. Hydrogenation was carried out for 5.0 hours at 265° C. and 900 psig hydrogen pressure. After cooling, purging with nitrogen, and filtering to remove catalyst, a water white product with the following characteristics was obtained: yield of 67.7% (proportionally based on original monomer charge); s.pt. 111° C.; MMAP 78° C.; color G-1- and YID 11.5 (both measured at 50% by weight in toluene with YID determined in a cell of 5.0 cm path length); Mz 1647; Mw 843; Mn 424, and Pd 1.99.

EXAMPLE 7

This example illustrates hydrogenation of DCPD/AMS resins at an initial ratio of 80/20.

redissolved in aliphatic solvent and hydrogenated under the conditions described in Table 6. Other process conditions not specified in Table 6 are the same as in Example 6. Note the apparent equivalence of Ni 5136P (Sample 1) and Ni 5256P (Sample 2) in these examples. Ni 5136P and Ni 5256P are available from Engelhard Corporation, Chemical Catalyst Group, Iselin, N.J., U.S.A. In the table, G=Gardner color.

Base resin samples 3–6 were prepared in a 50 gallon pilot plant thermal reactor using process conditions similar to those used for producing resins in the laboratory. Solvents and oligomers were removed under vacuum at temperatures of 180° to 200° C. Hydrogenation of the samples was carried out at three different temperatures, three catalyst levels and two different times to evaluate the effect of these variables. Thermal color stabilities are quite good for these types of hydrogenated DCPD-based resins.

TABLE 6

| Sample | 1 | 2 | 3 | 4 | 5 | 6 |
|---|---|---|---|---|---|---|
| Base resin | | | | | | |
| S.Pt. (°C.) | 104 | 105 | 103 | 103 | 103 | 103 |
| OMSCP (°C.) | 40/−40 | 69/<−50 | 25/12 | 25/12 | 25/12 | 25/12 |
| MMAP (°C.) | 40/37 | 38/36 | 43/40 | 43/40 | 43/40 | 43/40 |
| Color (Gardner) | 9+ | 9+ | 10+ | 10+ | 10+ | 10+ |
| Mz | 1553 | 1589 | 2191 | 2191 | 2191 | 2191 |
| Mw | 624 | 632 | 819 | 819 | 819 | 819 |
| Mn | 312 | 313 | 348 | 348 | 348 | 348 |
| Pd | 2.00 | 2.02 | 2.35 | 2.35 | 2.35 | 2.35 |
| Hydrogenated Resin | | | | | | |
| Wt. Resin (g) | 165.0 | 165.0 | 165.0*** | 165.0*** | 165.0*** | 165.0*** |
| Catalyst | Ni5136P | Ni5256P | Ni5136P | Ni5136P | Ni5136P | Ni5136P |
| % Catalyst | 1.50 | 1.50 | 1.50 | 1.50 | 1.00 | 0.50 |
| Aliphatic Solvent | 335.0 | 335.0 | 335.0 | 335.0 | 335.0 | 335.0 |
| Time (Hr.) | 4.0 | 4.0 | 4.0 | 4.0 | 3.0 | 3.0 |
| Temp. (°C.) | 250 | 250 | 250 | 265 | 225 | 225 |
| Hydrogen Pressure | 900 | 900 | 900 | 900 | 900 | 900 |
| Yield | 98.6 | 96.2 | 95.9 | 95.4 | 100.8 | 100.0 |
| S.Pt. (°C.) | 115 | 117 | 109** | 112** | 109** | 103** |
| OMSCP (°C.) | −12/<−50 | 13/<−50 | −30/<−50 | −33/<−50 | −25/<−50 | −20/<−50 |
| MMAP (°C.) | 73/71 | 74/70 | 82/57 | 76/71 | 76/70 | 74/70 |
| Color (G/YID*) | 1−/10.0 | 1−/8.7 | 1−/9.01 | 1−/6.39 | 1+/17.03 | 2/20.44 |
| % Irganox 1010 | 0.15 | 0.15 | 0.30 | 0.30 | 0.30 | 0.30 |
| 24 Hr. Heat Stab. (Gardner Color) | 5+ | 4+ | 2 | 2 | 4+ | 4+ |
| Mz | 1332 | 1331 | 1737 | 1729 | 1767 | 1740 |
| Mw | 600 | 607 | 740 | 737 | 752 | 742 |
| Mn | 316 | 319 | 344 | 345 | 346 | 342 |
| Pd | 1.90 | 1.90 | 2.15 | 2.13 | 2.16 | 2.16 |
| UVα | 0.095 | 0.097 | 0.147 | 0.165 | 0.192 | 0.25 |
| Bromine No. | 1.07 | 1.13 | 0.70 | 0.67 | 0.58 | 0.63 |

*2 CM cell
**Stripped to S.Pt.
***Stripped pilot plant resin.

DCPD 101 was used in all of the experiments listed in Table 6. DCPD 101 is available from Lyondell Petrochemical Company, Houston, Tex., U.S.A., and contains 85% DCPD and <1 ppm sulfur. AMS was the vinyl aromatic monomer, and all polymerization reactions were run at 60% monomer in solvent (initial concentration). All other process variables for the hydrogenation are given in Table 6.

Samples 1 and 2 were thermally polymerized in the laboratory using 245° C. reaction temperature (4.0 and 5.0 hour samples in Table 4). The isolated resins were then

EXAMPLE 8

This example illustrates copolymerization of dicyclopentadiene and alpha-methylstyrene using Shell DCPD (<5 ppm sulfur).

A blend of 288.0 g of 75% DCPD (available from Shell Chemical Company, Houston, Tex., U.S.A.), 72.0 g of AMS and 240.0 g of aliphatic solvent was added to a 1-liter Parr Autoclave, flushed with nitrogen and brought to 170° C. over a period of 30 minutes. The temperature was increased to 245° C. over a period of one hour and maintained at 245° C. for an additional 4.0 hours. The resin was isolated by distilling solvent and unreacted materials up to 210° C. under nitrogen. Steam stripping at 225° C. removed low molecular weight oligomers, leaving a 57.9% yield of copolymer resin with the following physical characteristics: s.pt. 106° C.; color G-9+; OMSCP 65/–42° C.; MMAP 65/36; Mz 1267; Mw 535; Pd 1.96. Note that this resin has physical properties that are almost identical to a DCPD/AMS 80/20 resin made under the same conditions using DCPD 101 from Lyondell Petrochemical Company, Houston, Tex., U.S.A. (see Table 4).

EXAMPLE 9

This example illustrates copolymerization of dicyclopentadiene and alpha-methylstyrene using a sulfur-containing feedstock (85% DCPD available from Petroplast Chemical Corp., White Plains, N.Y., U.S.A.) followed by poisoning attributable to 0.15% sulfur in the Petroplast DCPD (Sample 2). Poisoning is indicated by a lower level of hydrogenation and a darker hydrogenated resin color. A comparison is made with a resin (Sample 1 in Table 7) made under identical conditions using DCPD 101, available from Lyondell Petrochemical Company, Houston, Tex., U.S.A.

The mixtures described above were each polymerized in one liter autoclaves using identical conditions, as shown in Table 7. The resulting resin solutions were cooled to room temperature and the autoclaves were opened. Ni 5136P was added to each mixture, the autoclaves were again sealed, flushed with nitrogen and identical hydrogenations were carried out as shown. Ni 5136P is available from Engelhard Corporation, Chemical Catalyst Group, Iselin, N.J., U.S.A. At the end of the hydrogenation cycles, the products were cooled to 170° C., filtered to remove catalyst and finished in normal fashion, finally steaming at 225° C. The evidence that Sample 2, made from the sulfur-containing feed, has undergone less hydrogenation than the clean feed is compelling: lower MMAP, higher UV$\alpha$ and bromine number all show that Sample 2 is less aliphatic than Sample 1. There is also a striking difference in the colors of the two products, with the sulfur-containing feed resulting in color reduction only to a Gardner 3+ level, which is far from water-white.

TABLE 7

| Sample | 1 | 2 |
| --- | --- | --- |
| Lyondell DCPD 101 (<1 ppm S) | 288.0 g | — |
| Petroplast DCPD (1500 ppm S) (g) | — | 288.0 |
| AMS (g) | 72.0 | 72.0 |
| Aliphatic solvent (g) | 240.0 | 240.0 |
| Polymerization | | |
| Temp. (°C.) | 245 | 245 |
| Time (hr.) | 4.0 | 4.0 |
| Hydrogenation | | |
| Ni 5136P (g) | 3.00 | 3.00 |
| Time (hr.) | 3.0 | 3.0 |
| Temp. (°C.) | 225 | 225 |
| Resin Yield (%) | 53.3 | 60.8 |
| S.Pt. (°C.) | 96 | 108 |
| MMAP (°C.) | 74/66 | 66/62 |
| Gardner color (50% toluene) | 1– | 3+ |
| YID (2 cm Cell) | 25.4 | 49.0 |
| UV$\alpha$ | 0.067 | 0.218 |
| Bromine number | 0.41 | 1.01 |

TABLE 7-continued

| Sample | 1 | 2 |
| --- | --- | --- |
| Molecular weight | | |
| Mz | 1081 | 1231 |
| Mw | 485 | 540 |
| Mn | 270 | 286 |
| Pd | 1.79 | 1.89 |

It is not intended that the examples given here should be construed to limit the invention, but rather they are submitted to illustrate some of the specific embodiments of the invention. Various modifications and variations of the present invention can be made without departing from the scope of the appended claims.

We claim:

1. A hydrocarbon resin consisting essentially of a thermally polymerized copolymer made from (1) about 40% to 90% by weight based on total monomers of a cyclic diolefin component comprising at least about 50% by weight dicyclopentadiene, and (2) about 60% to 10% by weight based on total monomers of at least one vinyl aromatic component having the formula

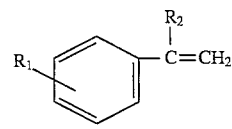

where $R_1$ is H or a 1–10 carbon linear or branched chain alkyl group at the meta- or para-position and $R_2$ is a 1–10 carbon linear or branched chain alkyl group or a 2-methyl-2-phenylpropyl group, the resin having a Ring and Ball softening point of about 70° to about 150° C., having a Mz with a maximum value of about 4000, having a Mw with a maximum value of about 2500, and having a Pd with a maximum value of about 3.0.

2. The resin of claim 1, wherein the Ring and Ball softening point of the resin is about 80° to about 140° C.

3. The resin of claim 1, wherein the cyclic diolefin component also comprises codimers of cyclopentadiene with at least one compound selected from the group consisting of methylcyclopentadiene, isoprene, butadiene, and piperylene.

4. The resin of claim 1, wherein the vinyl aromatic component also comprises up to 15% by weight, based on the total weight of monomers, of a compound selected from the group consisting of styrene and styrenes that are ring-substituted with straight chain or branched aliphatic groups.

5. The resin of claim 1, wherein the ratio of component (1) to component (2) is 1:1 or greater.

6. The resin of claim 1, wherein the cyclic diolefin component contains <1 ppm sulfur.

7. The resin of claim 1, wherein $R_1$ is selected from the group consisting of methyl, ethyl, isopropyl, and t-butyl groups.

8. The resin of claim 1, wherein the vinyl aromatic component is alpha-methylstyrene.

9. The resin of claim 1, wherein the vinyl aromatic component is para-methyl-alpha-methylstyrene.

10. The resin of claim 1, wherein the vinyl aromatic component is 2,4-diphenyl-4-methyl-1-pentene.

11. The resin of claim 6, wherein the vinyl aromatic component is alpha-methylstyrene.

12. The resin of claim 1, wherein the Ring and Ball softening point is 140°±5° C., Mz has maximum value of about 4000, Mw has a maximum value of about 2500, and Pd has a maximum value of about 3.0.

13. The resin of claim 1, wherein the Ring and Ball softening point is 125°±5° C., Mz has a maximum value of about 3000, Mw has a maximum value of about 2000, and Pd has a maximum value of about 2.5.

14. The resin of claim 1, wherein the Ring and Ball softening point is 100°±5° C., Mz has a maximum value of about 2000, Mw has a maximum value of about 1000, and Pd has a maximum value of about 2.0.

15. The resin of claim 1, wherein $R_2$ is selected from the group consisting of methyl, ethyl, isopropyl, and t-butyl groups.

16. The resin of claim 7, wherein $R_2$ is selected from the group consisting of methyl, ethyl, isopropyl, and t-butyl groups.

* * * * *